US009507166B2

(12) United States Patent
Lin

(10) Patent No.: US 9,507,166 B2
(45) Date of Patent: Nov. 29, 2016

(54) ILLUMINATION SYSTEM FOR STEREOSCOPIC PROJECTION DEVICE

(71) Applicant: DELTA ELECTRONICS, INC., Taoyuan Hsien (TW)

(72) Inventor: Shengwei Lin, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 361 days.

(21) Appl. No.: 14/151,301

(22) Filed: Jan. 9, 2014

(65) Prior Publication Data

US 2014/0192328 A1 Jul. 10, 2014

(30) Foreign Application Priority Data

Jan. 9, 2013 (TW) .............................. 102100671 A

(51) Int. Cl.
| | | |
|---|---|---|
| G03B 21/20 | (2006.01) |
| G02B 27/22 | (2006.01) |
| F21V 13/08 | (2006.01) |
| F21V 13/14 | (2006.01) |
| G02B 26/00 | (2006.01) |
| F21V 8/00 | (2006.01) |

(52) U.S. Cl.
CPC ........... *G02B 27/2235* (2013.01); *F21V 13/08* (2013.01); *F21V 13/14* (2013.01); *G02B 6/0096* (2013.01); *G02B 26/008* (2013.01); *G03B 21/204* (2013.01)

(58) Field of Classification Search
CPC ........ G02B 26/00; G02B 27/22; G02B 6/00; F21V 13/08; F21V 13/14; F21V 8/00; G03B 21/204
See application file for complete search history.

(56) References Cited

U.S. PATENT DOCUMENTS

| | | |
|---|---|---|
| 7,322,703 B2 | 1/2008 | Matsui |
| 2002/0045901 A1 | 4/2002 | Wagner et al. |
| 2013/0242534 A1* | 9/2013 | Pettitt .................. G03B 21/204 362/84 |
| 2013/0258292 A1* | 10/2013 | Lin ....................... G03B 21/204 353/31 |

FOREIGN PATENT DOCUMENTS

| | | |
|---|---|---|
| CN | 101846250 A | 9/2010 |
| CN | 101937161 A | 1/2011 |
| CN | 102854728 A | 1/2013 |
| CN | 1028546223 A | 1/2013 |
| DE | 4039674 | 7/1991 |
| JP | 2006023436 | 1/2006 |
| JP | 2011180353 | 9/2011 |
| JP | 2011191466 A | 9/2011 |
| TW | 201109720 | 3/2011 |

* cited by examiner

Primary Examiner — Sultan Chowdhury
Assistant Examiner — Danell L Owens
(74) Attorney, Agent, or Firm — Muncy, Geissler, Olds & Lowe, P.C.

(57) ABSTRACT

An illumination system for a stereoscopic projection device is provided. The illumination system comprises a luminous element and a color wheel module. The luminous element is adapted to generate a plurality of first wave band lights when the color wheel module has a plurality of wave band transmitting transforming areas and a plurality of wave band reflecting transforming areas. When the first wave band lights are projected to the wave band transmitting transforming areas, the first wave band lights are adapted to transmit the wave band transmitting transforming areas to excite a plurality of first selected wave band lights. When the first wave band lights are projected to the wave band reflecting transforming areas, the wave band reflecting transforming areas are adapted to excite and reflect a plurality of second selected wave band lights.

23 Claims, 8 Drawing Sheets

ILLUMINATION SYSTEM FOR STEREOSCOPIC PROJECTION DEVICE

This application claims priority to Taiwan Patent Application No. 102100671 filed on Jan. 9, 2013.

CROSS-REFERENCES TO RELATED APPLICATIONS

Not applicable.

BACKGROUND OF THE INVENTION

Field of the Invention

The present invention relates to an illumination system for a projection device, especially an illumination system for a stereoscopic projection device. In particular, the present invention relates to an illumination system comprising a color wheel module which includes a plurality of wave band transmitting transforming areas and a plurality of wave band reflecting transforming areas.

Descriptions of the Related Art

Stereoscopic projection devices have been widely used in various presentations and performances to display lively stereoscopic images so that viewers can feel as if they were personally on the scene.

Conventional illumination systems for stereoscopic projection devices usually have a color wheel and a color filter. First, a plurality of lights of the three primary colors is generated by means of an illumination source of the illumination system through a color wheel. The lights are transformed by a color filter into a plurality of lights of two different wavelengths. The lights of two different wavelengths are then transformed by an imaging system of the projection device into a left-eye viewing angle image and a right-eye viewing angle image respectively. Thereby, viewers can achieve the desired effect in which the left eye receives the left-eye viewing angle image and the right eye receives the right-eye viewing angle image by simply wearing a pair of passive eyeglasses. The brain of the viewer will automatically combine the left-eye viewing angle images and right-eye viewing angle images into a stereoscopic image.

However, because the aforesaid conventional illumination system has a color wheel and a color filter, it is impossible to miniaturize the volume of the stereoscopic projection device which comprises the conventional illumination system. In addition, the lights of the three primary colors will be projected to the color filter at different incident angles. If the lights are not projected to the color filter at an angle which is almost perpendicular to the color filter, then the lights of undesired wavelengths tend to be generated through transformation. That is, image cross-talk is likely to happen. Image cross-talk refers to the situation when the right eye of the user will see the right-eye viewing angle image and part of the left-eye viewing angle image simultaneously, or vice-versa.

Accordingly, it is important in the art to provide an illumination system for a stereoscopic projection device that can improve the aforesaid shortcomings and avoid image cross-talk.

SUMMARY OF THE INVENTION

An objective of the present invention is to provide an illumination system with a miniaturized volume for use in a stereoscopic projection device. Another objective of the present invention is to provide an illumination system for a stereoscopic projection device which can precisely provide a plurality of lights with two different predetermined wavelengths.

To achieve the aforesaid objectives, an illumination system for a stereoscopic projection device according to a first embodiment of the present invention comprises a luminous element and a color wheel module. The luminous element is adapted to generate a plurality of first wave band lights. The color wheel module has a rotating disk, a plurality of wave band transmitting transforming areas and a plurality of wave band reflecting transforming areas which are formed on the rotating disk. When the first wave band lights are projected to the wave band transmitting transforming areas, the first wave band lights can transmit the wave band transmitting transforming areas to excite a plurality of first selected wave band lights which are different from the first wave band lights. When the first wave band lights are projected to the wave band reflecting transforming areas, a plurality of second selected wave band lights, which are different from the first wave band lights and the first selected wave band lights, are excited and reflected from the wave band reflecting transforming areas.

Further, to achieve the aforesaid objectives, an illumination system for a stereoscopic projection device according to a second embodiment of the present invention comprises a luminous element and a color wheel module. The luminous element is adapted to generate a plurality of first wave band blue lights and a plurality of second wave band blue lights respectively. The color wheel module has a rotating disk, a first wave band transmitting area, a second wave band transmitting area, a plurality of wave band transmitting transforming areas, and a plurality of wave band reflecting transforming areas which are formed on the rotating disk. The first wave band blue lights can transmit the first wave band transmitting area, while the second wave band blue lights can transmit the second wave band transmitting area. When the first wave band blue lights are projected to the wave band transmitting transforming areas, the first wave band blue lights can transmit the wave band transmitting transforming areas to excite a plurality of first selected wave band lights. Similarly, when the second wave band blue lights are projected to the wave band reflecting transforming areas, a plurality of second selected wave band lights are excited and reflected from the wave band reflecting transforming areas.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
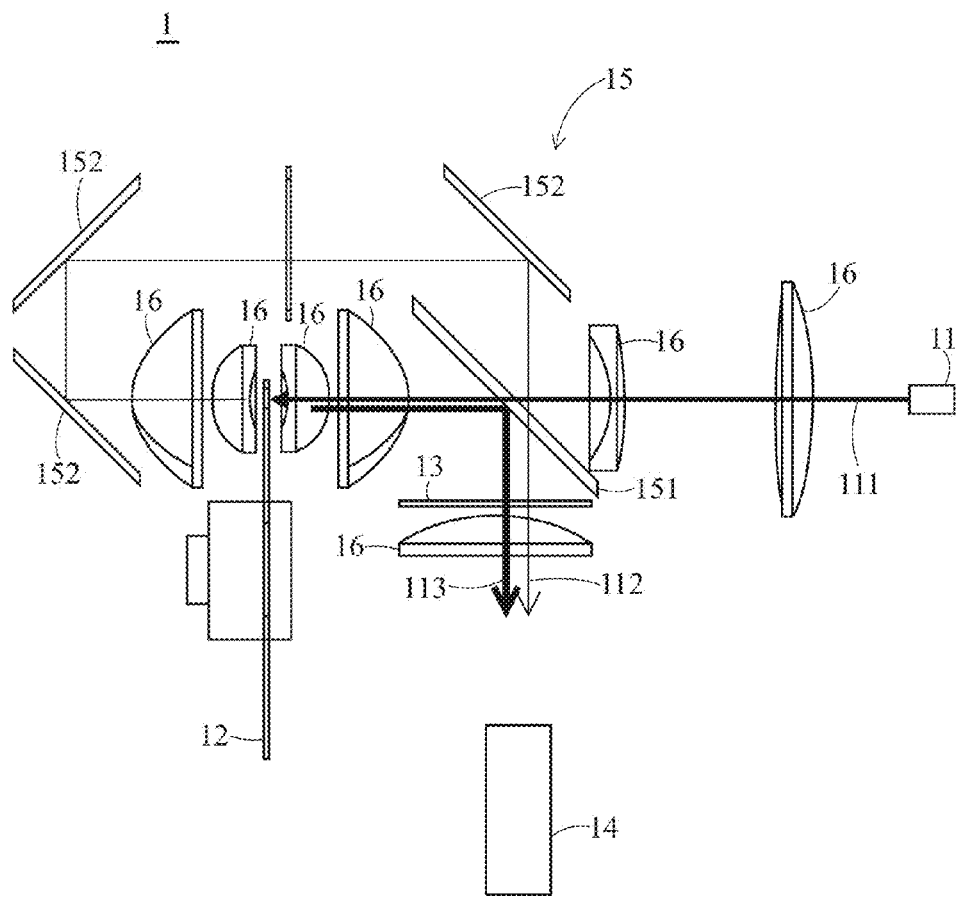
FIG. 1A is a schematic view of an illumination system according to a first embodiment of the present invention.
Figure 2:
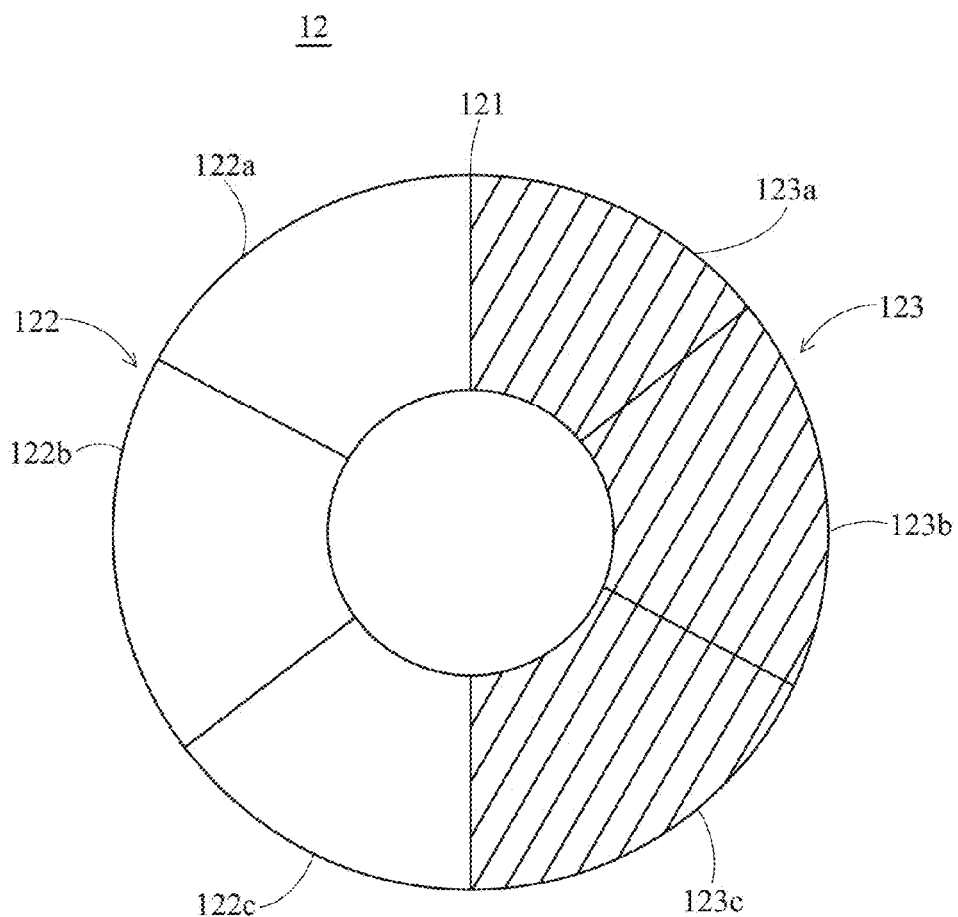
FIG. 2 is a schematic view of a color wheel module of the illumination system according to the first embodiment of the present invention.

FIG. 1A illustrates a schematic view of an illumination system 1 for a stereoscopic projection device according to a first embodiment of the present invention is shown therein. The illumination system 1 comprises a luminous element 11 and a color wheel module 12. As shown in FIG. 1A, the luminous element 11 is adapted to generate a plurality of first wave band lights 111. FIG. 2, illustrates a schematic view of a color wheel module 12 of this embodiment. The color wheel module 12 has a rotating disk 121 that is rotary, a plurality of wave band transmitting transforming areas 122 and a plurality of wave band reflecting transforming areas 123 which are formed on the rotating disk 121. In practical operation of the illumination system 1 of this embodiment, the rotating disk 121 keeps rotating to have the first wave band lights 111 which are generated by the luminous element 11 projected to each of the wave band transmitting transforming areas 122 and each of the wave band reflecting transforming areas 123 in rotation.

Furthermore, FIG. 1A illustrates the first wave band lights 111 transmitting the wave band transmitting transforming areas 122 to excite a plurality of first selected wave band lights 112 different from the first wave band lights 111 when the first wave band lights 111 are projected to the transmitting transforming areas 122. When the first wave band lights 111 are projected to the wave band reflecting transforming areas 123, a plurality of second selected wave band lights 113 different from the first wave band lights 111 and the first selected wave band lights 112 are excited and reflected from the wave band reflecting transforming areas 123.

The stereoscopic projection device may comprise an imaging module (not shown) for transforming the first selected wave band lights 112 and the second selected wave band lights 113 into a first projection picture and a second projection picture respectively. In practical application of the illumination system of this embodiment, the imaging module can receive and transform the first selected wave band lights 112 into a first projection picture as a right-eye viewing angle image. The imaging module can receive and transform the second selected wave band lights 113 into a second projection picture as a left-eye viewing angle image. Thus, the viewer can achieve the desired effect that the left eye receives the left-eye viewing angle image and the right eye receives the right-eye viewing angle image simply by wearing a pair of passive eyeglasses. The brain of the viewer will automatically combine the left-eye viewing angle image and right-eye viewing angle image into a stereoscopic image.

Figure 1B:
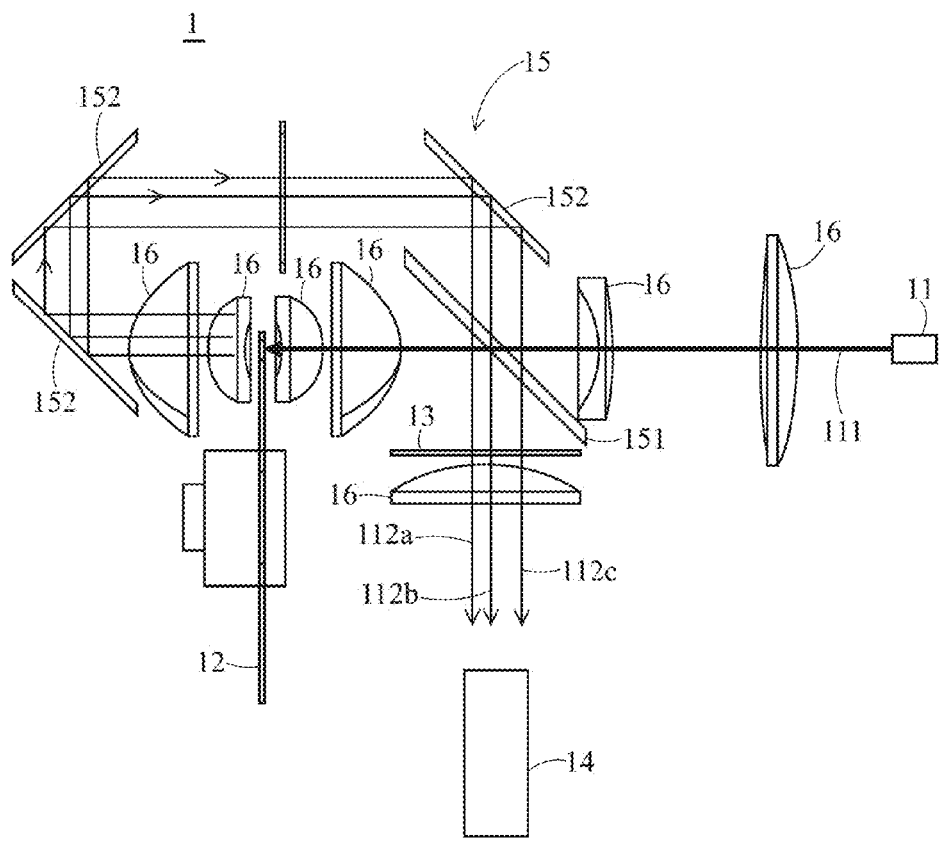
FIG. 1B is a schematic view of a light path of a plurality of first wave band lights projected to a plurality of wave band transmitting transforming areas in the illumination system according to the first embodiment of the present invention.

Furthermore, FIG. 1B and FIG. 2 are referred to together. FIG. 1B is a schematic view of a light path of the first wave band lights 111 projected to the wave band transmitting transforming areas 122 in this embodiment. The wave band transmitting transforming areas 122 include a first red fluorescent area 122a, a first blue fluorescent area 122b and a first green fluorescent area 122c. When the first wave band lights 111 are projected to the first red fluorescent area 122a, the first wave band lights 111 can transmit the first red fluorescent area 122a to excite a plurality of first selected wave band red lights 112a of the first selected wave band lights 112. When the first wave band lights 111 are projected to the first blue fluorescent area 122b, the first wave band lights 111 can transmit the first blue fluorescent area 122b to excite a plurality of first selected wave band blue lights 112b of the first selected wave band lights 112. Similarly, when the first wave band lights 111 are projected to the first green fluorescent area 122c, the first wave band lights 111 can transmit the first green fluorescent area 122c to excite a plurality of first selected wave band green lights 112c of the first selected wave band lights 112. The imaging module can then transform the first selected wave band red lights 112a, the first selected wave band blue lights 112b and the first selected wave band green lights 112c into the first projection picture.

Figure 1C:
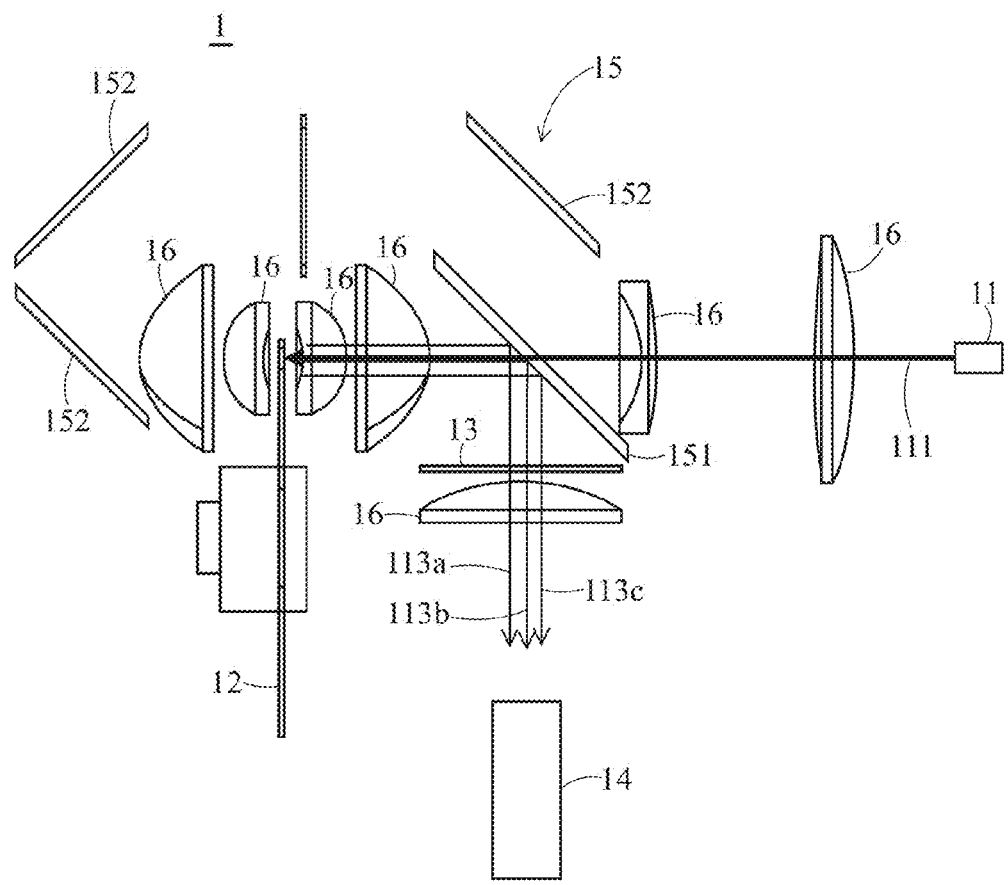
FIG. 1C is a schematic view of a light path of a plurality of first wave band lights projected to a plurality of wave band reflecting transforming areas in the illumination system according to the first embodiment of the present invention.

Next, FIGS. 1C and 2 will be referred to together. FIG. 1C is a schematic view of the light path of the first wave band lights 111 projected to the wave band reflecting transforming areas 123 in this embodiment. The wave band reflecting transforming areas 123 include a second red fluorescent area 123a, a second blue fluorescent area 123b and a second green fluorescent area 123c. When the first wave band lights 111 are projected to the second red fluorescent area 123a, a plurality of second selected wave band red lights 113a of the second selected wave band lights 113 are excited and reflected from the second red fluorescent area 123a. When the first wave band lights 111 are projected to the second blue fluorescent area 123b, a plurality of second selected wave band blue lights 113b of the second selected wave band lights 113 are excited and reflected from the second blue fluorescent area 123b. When the first wave band lights 111 are projected to the second green fluorescent area 123c, a plurality of second selected wave band green lights 113c of the second selected wave band lights 113 are excited and reflected from the second green fluorescent area 123c. Then, the second selected wave band red lights 113a, the second selected wave band blue lights 113b and the second selected wave band green lights 113c can be transformed by the imaging module into the second projection picture.

The illumination system 1 of this embodiment comprises a filter 13, a light tunnel 14, a plurality of light guiding elements 15 and a plurality of lenses 16. The light guiding elements 15 include a first light guiding element 151 and a plurality of second light guiding elements 152 for guiding at least one of the first wave band lights 111, the first selected wave band lights 112 and the second selected wave band lights 113. The lenses 16 are adapted to focus at least one of the first wave band lights 111, the first selected wave band lights 112 and the second selected wave band lights 113.

Propagation of the first wave band lights 111 and the first selected wave band lights 112 will now be further described in detail. With reference to FIGS. 1A and 1B, the first wave band lights 111 firstly propagates through at least one of the lens 16 and through the first light guiding element 151 towards the color wheel module 12. When the first wave band lights 111 are projected to and transmit through the wave band transmitting transforming areas 122, the first selected wave band lights 112 (in this embodiment, including the first selected wave band red lights 112a, the first selected wave band blue lights 112b and the first selected wave band green lights 112c) will be excited. Then, the first selected wave band lights 112 are focused by other lens 16 and reflected to the filter 13 by the second light guiding elements 152. Thereafter, the first selected wave band lights 112 are projected to the light tunnel 14 through at least one of the lenses 16, and are finally provided to the imaging module by the light tunnel 14.

Still with reference to FIGS. 1A and 1C, the first light guiding element 151 is disposed between the luminous element 11 and the color wheel module 12. Similarly, the first wave band lights 111 firstly propagates through at least one of the lenses 16 and through the first light guiding element 151 towards the color wheel module 12. When the first wave band lights 111 are projected to the wave band reflecting transforming areas 123, the second selected wave band lights 113 (in this embodiment, including the second selected wave band red lights 113a, the second selected wave band blue lights 113b and the second selected wave band green lights 113c) are excited from the wave band reflecting transforming areas 123 and reflected to the first light guiding element 151. Then, the second selected wave band lights 113 are reflected to the filter 13 by the first light guiding element 151 and then projected to the light tunnel 14 through at least one of the lenses 16. Finally, the second selected wave band lights 113 are provided to the imaging module by the light tunnel 14.

To control the angles at which the first selected wave band lights 112 and the second selected wave band lights 113 are projected to the light tunnel 14, parts of the first selected wave band lights 112 and the second selected wave band lights 113 will be chosen by the filter 13 in this embodiment. In other words, only parts of the first selected wave band lights 112 and the second selected wave band lights 113 which are perpendicular to the filter 13 are allowed to pass through the filter 13. That is, if the angle in included between the first selected wave band lights 112 and the filter 13 when the first selected wave band lights 112 are projected to the filter 13 is 90 degrees, the first selected wave band lights 112 will be allowed to pass through the filter 13. Similarly, if the angle is included between the second selected wave band lights 113 and the filter 13 when the second selected wave band lights 113 are projected to the filter 13 is 90 degrees, the second selected wave band lights 113 will be allowed to pass through the filter 13. Then, the parts of the first selected wave band lights 112 and the second selected wave band lights 113 which are perpendicular to the filter 13 can be projected to the light tunnel 14 after being focused by the lens 16. Thereby, changes in the wavelength of the first selected wave band lights 112 and the second selected wave band lights 113 due to excessively large incident angles can be avoided to prevent the aforesaid phenomenon of image cross talk. In this embodiment, to filter the first selected wave band lights 112 and the second selected wave band lights 113 effectively, the filter 13 is a narrow band filter.

It should be appreciated that when the first selected wave band lights 112 and the second selected wave band lights 113 are projected to the filter 13, the angle included between the lights and the filter 13 is not limited to 90 degrees; rather, in this embodiment, the angle may range between 80 degrees to 110 degrees.

Furthermore, in FIGS. 1A, 1B and 1C, the arrows used to denote the first wave band lights 111, the first selected wave band lights 112, the second selected wave band lights 113, the first selected wave band red lights 112a, the first selected wave band blue lights 112b, the first selected wave band green lights 112c, the second selected wave band red lights 113a, the second selected wave band blue lights 113b and the second selected wave band green lights 113c are only for purpose of illustrating the traveling path of the lights rather than representing the number of the lights.

Figure 3A:
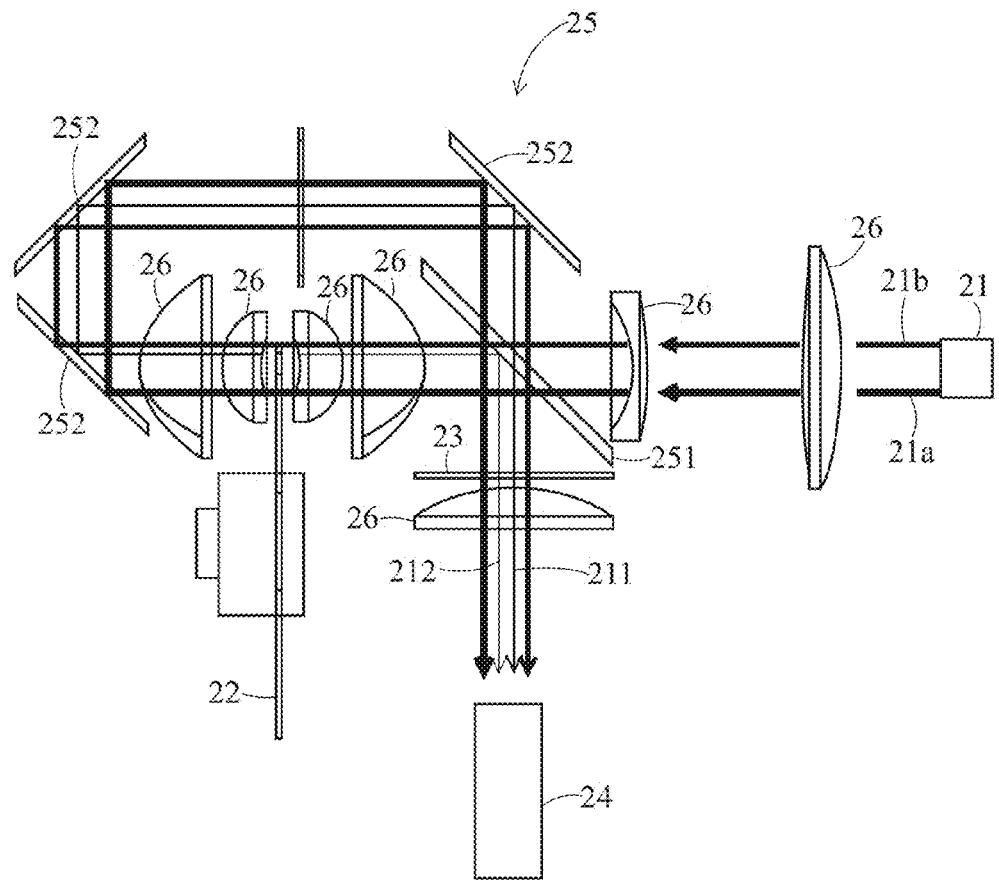
FIG. 3A is a schematic view of an illumination system according to a second embodiment of the present invention.

FIG. 3A illustrates a schematic view of an illumination system 2 for a stereoscopic projection device according to a second embodiment of the present invention. The illumination system 2 of this embodiment differs from the illumination system 1 of the first embodiment of the present invention in that the illumination system 2 comprises a luminous element 21 which generates a plurality of first wave band blue lights 21a and a plurality of second wave band blue lights 21b. The first wave band blue lights 21a and the second wave band blue lights 21b are alternately emitted. Hereinbelow, the detailed structure of the illumination system 2 of this embodiment will be described in detail.

Figure 4:
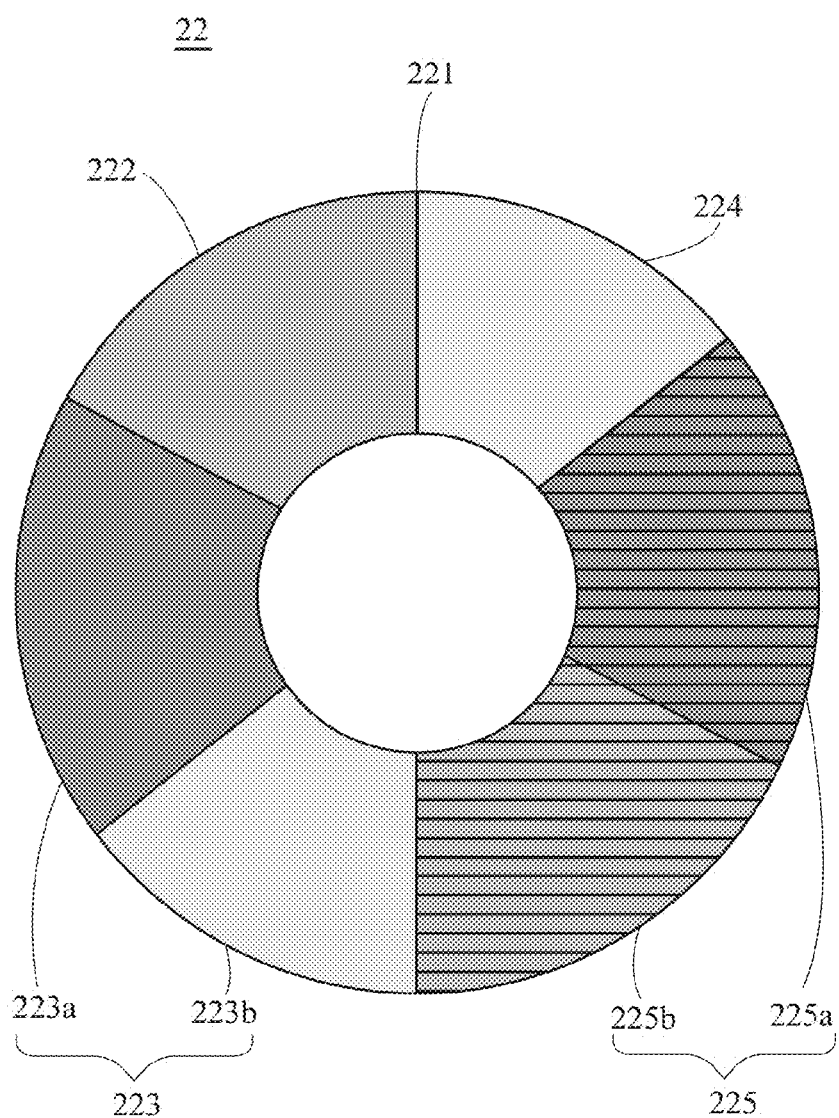
FIG. 4 is a schematic view of the color wheel module of the illumination system according to the second embodiment of the present invention.

As shown in FIG. 3A, the illumination system 2 comprises a luminous element 21 and a color wheel module 22. The luminous element 21 is adapted to generate a plurality of first wave band blue lights 21a and a plurality of second wave band blue lights 21b. FIG. 4 further illustrates a schematic view of the color wheel module 22 of this embodiment. The color wheel module 22 has a rotating disk 221, a first wave band transmitting area 222, a plurality of wave band transmitting transforming areas 223, a second wave band transmitting area 224, and a plurality of wave band reflecting transforming areas 225 which are formed on the rotating disk 221. In practical operation of the illumination system 2 of this embodiment, the first wave band blue lights 21a and the second wave band blue lights 21b are alternately emitted while the rotating disk 221 keeps rotating. The first wave band blue lights 21a generated by the luminous element 21 will only be projected to the first wave band transmitting area 222 and each of the wave band transmitting transforming areas 223 in rotation, while the second wave band blue lights 21b generated by the luminous element 21 will only be projected to the second wave band transmitting area 224 and each of the wave band reflecting transforming areas 225 in rotation.

Furthermore, with reference to FIG. 3A, the first wave band blue lights 21a can transmit the first wave band transmitting area 222, while the second wave band blue lights 21b can transmit the second wave band transmitting area 224. When the first wave band blue lights 21a are projected to the wave band transmitting transforming areas 223, the first wave band blue lights 21a can transmit the wave band transmitting transforming areas 223 to excite a plurality of first selected wave band lights 211. When the second wave band blue lights 21b are projected to the wave band reflecting transforming areas 225, a plurality of second selected wave band lights 212 are excited and reflected from the wave band reflecting transforming areas 225.

The stereoscopic projection device comprises an imaging module for transforming the first wave band blue lights 21a and the first selected wave band lights 211 into a first projection picture and transforming the second wave band blue lights 21b and the second selected wave band lights 212 into a second projection picture. In the practical application of the illumination system of this embodiment, the imaging module can receive and transform the first wave band blue lights 21a and the first selected wave band lights 211 into a first projection picture as a right-eye viewing angle image. The imaging module can also receive and transform the second wave band blue lights 21b and the second selected wave band lights 212 into a second projection picture as a left-eye viewing angle image. Thus, the viewer can achieve the desired effect in which the left eye receives the left-eye viewing angle image and the right eye receives the right-eye viewing angle image by simply wearing a pair of passive eyeglasses. The brain of the viewer will automatically combine the left-eye viewing angle image and right-eye viewing angle image into a stereoscopic image.

Figure 3B:
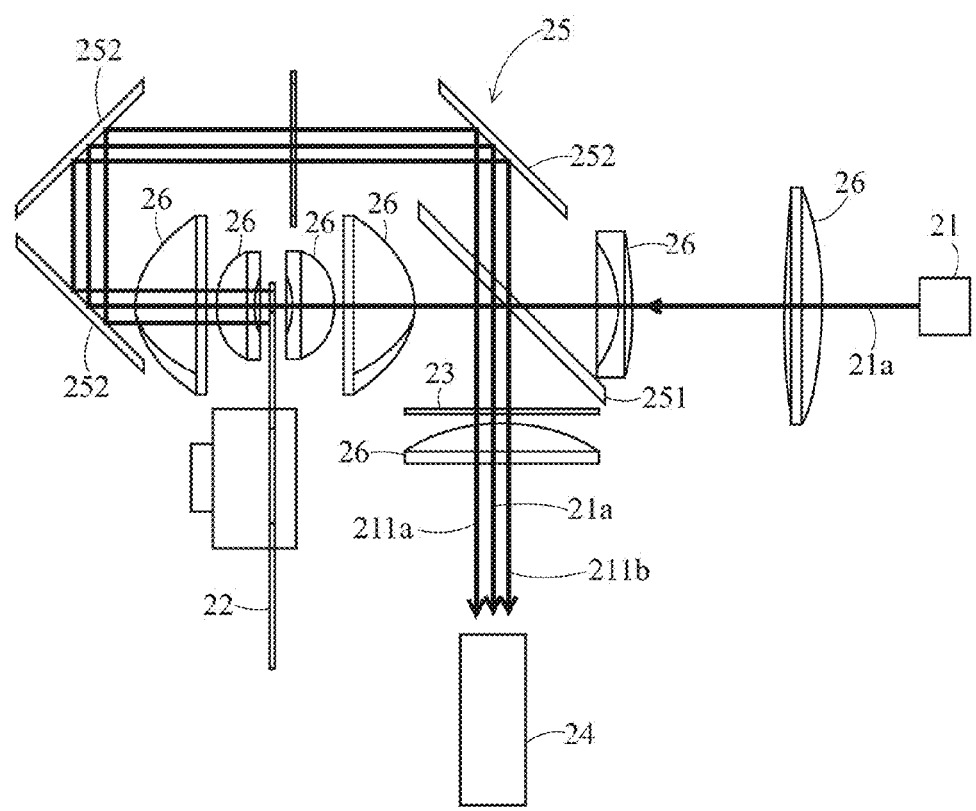
FIG. 3B is a schematic view of a light path of a plurality of first wave band blue lights projected to a first wave band transmitting area and a plurality of wave band transmitting transforming areas in the illumination system according to the second embodiment of the present invention.

The following will refer to both FIGS. 3B and 4. FIG. 3B is a schematic view of the light path of the first wave band blue lights 21a projected to the first wave band transmitting area 222 and the wave band transmitting transforming areas 223 in this embodiment. When the first wave band blue lights 21a transmit the first wave band transmitting area 222, the first wave band blue lights 21a just simply transmit the first wave band transmitting area 222 without any changes in wavelength, frequency or color. The wave band transmitting transforming areas 223 include a first red fluorescent area 223a and a first green fluorescent area 223b. When the first wave band blue lights 21a transmit the first red fluorescent area 223a, a plurality of first selected wave band red lights 211a of the first selected wave band lights 211 are excited. Similarly, when the first wave band blue lights 21a transmit the first green fluorescent area 223b, a plurality of first selected wave band green lights 211b of the first selected wave band lights 211 are excited. Then, the first wave band blue lights 21a, the first selected wave band red lights 211a and the first selected wave band green lights 211b can be transformed by the imaging module into the first projection picture. In this embodiment, the first wave band blue lights 21a, the first selected wave band red lights 211a and the first selected wave band green lights 211b all have the same wavelength and frequency. In this embodiment, the first wave band blue lights 21a and the first selected wave band lights 211 all have a wavelength of 460 nm. However, in other preferred embodiments of the present invention, the first wave band blue lights 21a and the first selected wave band lights 211 may all have a wavelength ranging between 460 nm and 470 nm.

Figure 3C:
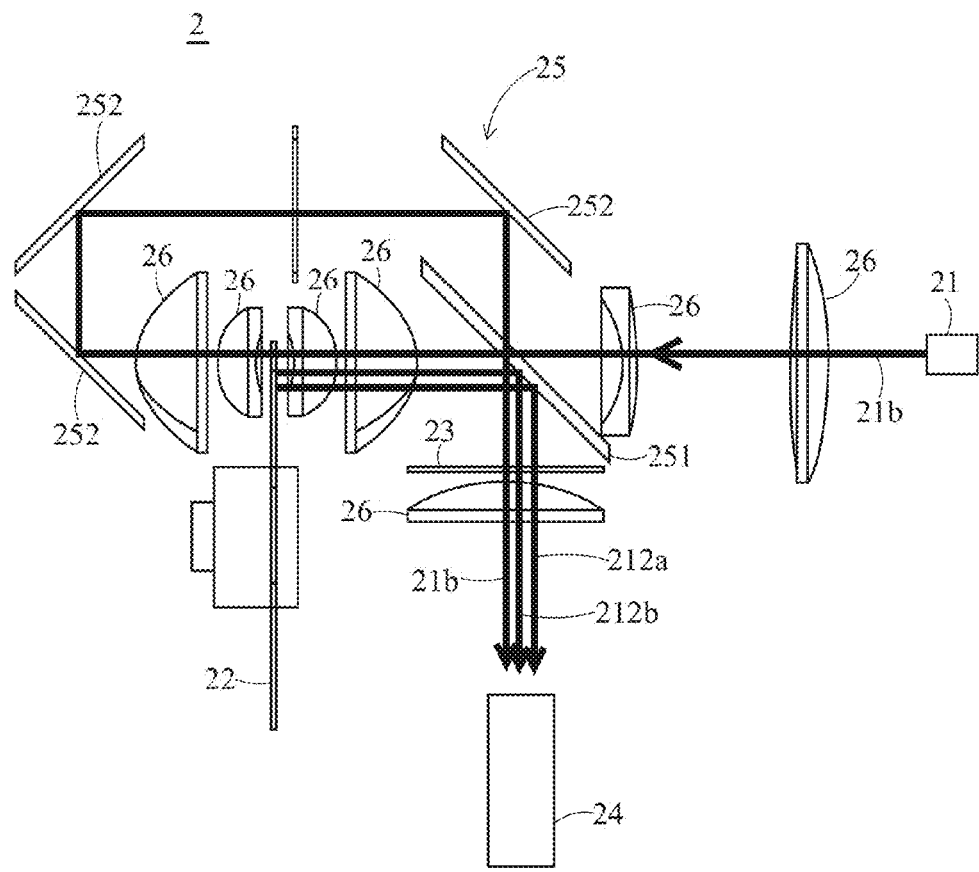
FIG. 3C is a schematic view of a light path of a plurality of second wave band blue lights projected to a second wave band transmitting area and a plurality of wave band reflecting transforming areas in the illumination system according to the second embodiment of the present invention.

The following will refer to both FIGS. 3C and 4. FIG. 3C is a schematic view of the light path of the second wave band blue lights 21b projected to the second wave band transmitting area 224 and the second wave band transmitting transforming areas 225 in this embodiment. When the second wave band blue lights 21b transmit the second wave band transmitting area 224, the second wave band blue lights 21b just simply transmit the second wave band transmitting area 224 without any changes in wavelength, frequency or color. The second wave band transmitting transforming areas 225 include a second red fluorescent area 225a and a second green fluorescent area 225b. When the second wave band blue lights 21b transmit the second red fluorescent area 225a, a plurality of second selected wave band red lights 212a of the second selected wave band lights 212 are excited. Similarly, when the second wave band blue lights 21b transmit the second green fluorescent area 225b, a plurality of second selected wave band green lights 212b of the second selected wave band lights 212 are excited. The imaging module can then transform the second wave band blue lights 21b, the second selected wave band red lights 212a and the second selected wave band green lights 212b into the second projection picture. In this embodiment, the second wave band blue lights 21b, the second selected wave band red lights 212a and the second selected wave band green lights 212b all have the same wavelength and frequency. In this embodiment, the second wave band blue lights 21b and the second selected wave band lights 212 all have a wavelength of 448 nm. However, in other preferred embodiments of the present invention, the second wave band blue lights 21b and the second selected wave band lights 212 may all have a wavelength ranging between 440 nm and 450 nm.

The illumination system 2 of this embodiment comprises a filter 23, a light tunnel 24, a plurality of light guiding elements 25 and a plurality of lenses 26. The light guiding elements 25 include a first light guiding element 251 and a plurality of second light guiding elements 252 for guiding at least one of the first wave band blue lights 21a, the first selected wave band lights 211, the second wave band blue lights 21b and the second selected wave band lights 212. The lenses 26 are adapted to focus at least one of the first wave band blue lights 21a, the first selected wave band lights 211, the second wave band blue lights 21b and the second selected wave band lights 212.

Now, the traveling paths of the first wave band blue lights 21a and the first selected wave band lights 211 will be further described in detail. With reference to FIGS. 3A and 3B, the first wave band blue lights 21a firstly propagates through at least one of the lenses 26 and through the first light guiding element 251 towards the color wheel module 22. Then, the first wave band blue lights 21a transmit the first wave band transmitting area 222, are then focused by other lenses 26 and reflected to the filter 23 by the second light guiding elements 252. Thereafter, the first wave band blue lights 21a are projected to the light tunnel 24 through at least one of the lenses 26, and are finally provided to the imaging module by the light tunnel 24. After the first wave band blue lights 21a are projected to and transmit the wave band transmitting transforming areas 223, the first selected wave band lights 211 (in this embodiment, including the first selected wave band red lights 211a and the first selected wave band green lights 211b) are excited. The first selected wave band lights 211 are then focused by other lenses 26 and reflected to the filter 23 by the second light guiding elements 252. Thereafter, the first selected wave band lights 211 are projected to the light tunnel 24 through at least one of the lenses 26, and are finally provided to the imaging module by the light tunnel 24.

With reference to both FIGS. 3A and 3C, the first light guiding element 251 is disposed between the luminous element 21 and the color wheel module 22. Similarly, the second wave band blue lights 21b firstly propagate through at least one of the lenses 26 and through the first light guiding element 251 towards the color wheel module 22. The second wave band blue lights 21b then transmit the second wave band transmitting area 222 and are focused by other lenses 26 and reflected to the filter 23 by the second light guiding elements 252. Thereafter, the second wave band blue lights 21b are projected to the light tunnel 24 through at least one of the lenses 26, and are finally provided to the imaging module by the light tunnel 24. After being generated by the luminous element 21, the second wave band blue lights 21b firstly propagates through at least one of the lenses 26 and through the first light guiding element 251 towards the color wheel module 22. When the second wave band blue lights 21b are projected to the wave band reflecting transforming areas 225, the second selected wave band lights 212 are excited from the wave band reflecting transforming areas 225 and are reflected to the first light guiding element 251. The second selected wave band lights 212 are then reflected to the filter 23 by the first light guiding element 251. Thereafter, the second selected wave band lights 212 are projected to the light tunnel 24 through at least one of the lenses 26, and are finally provided to the imaging module by the light tunnel 24.

To control the angles at which the first wave band blue lights 21a, the first selected wave band lights 211, the second wave band blue lights 21b and the second selected wave band lights 212 are projected to the light tunnel 24, parts of the first wave band blue lights 21a, the first selected wave band lights 211, the second wave band blue lights 21b and the second selected wave band lights 212 are chosen by the filter 23 in this embodiment. In other words, only parts of the first wave band blue lights 21a, the first selected wave band lights 211, the second wave band blue lights 21b and the second selected wave band lights 212 which are perpendicular to the filter 23 are allowed to pass through the filter 23. That is, if the angle is included between the first wave band blue lights 21a and the filter 23 is 90 degrees when the first wave band blue lights 21a are projected to the filter 23, the first wave band blue lights 21a are allowed to pass through the filter 23. If the angle between the first selected wave band lights 211 and the filter 23 is 90 degrees when the first selected wave band lights 211 are projected to the filter 23, the first selected wave band lights 211 are allowed to pass through the filter 23. If the angle between the second wave band blue lights 21b and the filter 23 is 90 degrees when the second wave band blue lights 21b are projected to the filter 23, the second wave band blue lights 21b are allowed to pass through the filter 23. Similarly, if the angle between the second selected wave band lights 212 and the filter 23 is 90 degrees when the second selected wave band lights 212 are projected to the filter 23, the second selected wave band lights 212 are allowed to pass through the filter 23. Then, the parts of the first wave band blue lights 21a, first selected wave band lights 211, second wave band blue lights 21b and second selected wave band lights 212 which are perpendicular to the filter 23 are focused by the lenses 26 and then projected to the light tunnel 24. Thereby, changes in the wavelength of the first wave band blue lights 21a, the first selected wave band lights 211, the second wave band blue lights 21b and the second selected wave band lights 212 due to excessively large incident angles can be avoided to prevent the aforesaid phenomenon of image cross-talk. In this embodiment, to filter the first wave band blue lights 21a, the first selected wave band lights 211, the second wave band blue lights 21b and the second selected wave band lights 212 effectively, the filter 23 is a narrow band filter.

It should be appreciated that when the first wave band blue lights 21a, the first selected wave band lights 211, the second wave band blue lights 21b and the second selected wave band lights 212 are projected to the filter 23, the angles between the lights and the filter 23 are not limited to 90 degrees, and in other embodiments of the present invention, the angle may range between 80 degrees and 110 degrees.

It should be appreciated that in FIGS. 3A, 3B and 3C, the arrows used to denote the first wave band blue lights 21a, the first selected wave band lights 211, the second wave band blue lights 21b, the second selected wave band lights 212, the first selected wave band red lights 211a, the first selected wave band green lights 211b, the second selected wave band red lights 212a, and the second selected wave band green lights 212b are only for purpose of illustrating the traveling path of the lights rather than representing the number of the lights.

According to the above descriptions, as compared to the conventional illumination system of stereoscopic projection devices which requires the use of a color wheel and a color filter to generate lights of two different wavelengths, the illumination system for a stereoscopic projection device of the present invention can generate lights of two different predetermined wavelengths by simply using a single color wheel comprising a plurality of wave band transmitting transforming areas and a plurality of wave band reflecting areas. This effectively reduces the volume of the illumination system. Furthermore, the incident angles of the lights can be effectively filtered through the disposition of the filter, so the problem of image cross-talk can be prevented to improve the quality of the images displayed by the stereoscopic projection devices.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination system for a stereoscopic projection device, comprising:
    a luminous element generating a plurality of first wave band lights; and
    a color wheel module having a rotating disk, a plurality of wave band transmitting transforming areas and a plurality of wave band reflecting transforming areas which are formed on the rotating disk;
    wherein when the first wave band lights are projected to the wave band transmitting transforming areas, the first wave band lights transmit the wave band transmitting transforming areas to excite a plurality of first selected wave band lights different from the first wave band lights, and when the first wave band lights are projected to the wave band reflecting transforming areas, a plurality of second selected wave band lights different from the first wave band lights and the first selected wave band lights are excited and reflected from the wave band reflecting transforming areas.

2. The illumination system as claimed in claim 1, wherein the illumination system comprises a filter, the first selected wave band lights and the second selected wave band lights transmit the filter at an angle which is between 80 degrees to 110 degrees.

3. The illumination system as claimed in claim 2, wherein the filter is a narrow band filter.

4. The illumination system as claimed in claim 1, wherein the wave band transmitting transforming areas have a first red fluorescent area, a first blue fluorescent area and a first green fluorescent area, and when the first wave band lights respectively transmit the first red fluorescent area, the first blue fluorescent area and the first green fluorescent area, a plurality of first selected wave band red lights, a plurality of first selected wave band blue lights and a plurality of first selected wave band green lights of the first selected wave band lights are excited respectively.

5. The illumination system as claimed in claim 1, wherein the wave band reflecting transforming areas have a second red fluorescent area, a second blue fluorescent area and a second green fluorescent area, and when the first wave band lights are projected to the wave band reflecting transforming areas, a plurality of second selected wave band red lights, a plurality of second selected wave band blue lights and a plurality of second selected wave band green lights of the second selected wave band lights are excited and reflected from the second red fluorescent area, the second blue fluorescent area and the second green fluorescent area respectively.

6. The illumination system as claimed in claim 2, wherein the illumination system comprises a light tunnel, the first selected wave band lights and the second selected wave band lights which are perpendicular to the filter are projected to the light tunnel after passing through the filter.

7. The illumination system as claimed in claim 2, wherein the illumination system comprises a plurality of light guiding elements, a first light guiding element of the light guiding elements is disposed between the luminous element and the color wheel module, and the first light guiding element reflects the second selected wave band lights to the filter.

8. The illumination system as claimed in claim 7, wherein the light guiding elements have a plurality of second light guiding elements to reflect the first selected wave band lights to the filter.

9. The illumination system as claimed in claim 2, wherein the illumination system comprises a plurality of lenses to focus at least one of the first wave band lights, the first selected wave band lights and the second selected wave band lights.

10. The illumination system as claimed in claim 1, wherein the stereoscopic projection device has an imaging module for transforming the first selected wave band lights and the second selected wave band lights into a first projection picture and a second projection picture respectively.

11. An illumination system for a stereoscopic projection device, comprising:
a luminous element generating a plurality of first wave band blue lights and a plurality of second wave band blue lights respectively; and
a color wheel module having a rotating disk, a first wave band transmitting area, a plurality of wave band transmitting transforming areas, a second wave band transmitting area and a plurality of wave band reflecting transforming areas which are formed on the rotating disk;
wherein the first wave band blue lights transmit the first wave band transmitting area, the second wave band blue lights transmit the second wave band transmitting area, and when the first wave band blue lights are projected to the wave band transmitting transforming areas, the first wave band blue lights transmit the wave band transmitting transforming areas to excite a plurality of first selected wave band lights, and when the second wave band blue lights are projected to the wave band reflecting transforming areas, a plurality of second selected wave band lights are excited and reflected from the wave band reflecting transforming areas.

12. The illumination system as claimed in claim 11, wherein the illumination system comprises a filter, the first wave band blue lights, the first selected wave band lights, the second wave band blue lights and the second selected wave band lights transmit the filter at an angle which is between 80 degrees to 110 degrees.

13. The illumination system as claimed in claim 12, wherein the filter is a narrow band filter.

14. The illumination system as claimed in claim 11, wherein the wave band transmitting transforming areas have a first red fluorescent area and a first green fluorescent area, and when the first wave band blue lights transmit the first red fluorescent area and the first green fluorescent area respectively, a plurality of first selected wave band red lights and a plurality of first selected wave band green lights of the first selected wave band lights are excited respectively.

15. The illumination system as claimed in claim 11, wherein the wave band transmitting transforming areas have a second red fluorescent area and a second green fluorescent area, and when the second wave band blue lights are projected to the wave band reflecting transforming areas, a plurality of second selected wave band red lights and a plurality of second selected wave band green lights of the second selected wave band lights are excited and reflected from the second red fluorescent area and the second green fluorescent area respectively.

16. The illumination system as claimed in claim 12, wherein the illumination system comprises a light tunnel, the first wave band blue lights, the first selected wave band lights, the second wave band blue lights and the second selected wave band lights which are perpendicular to the filter are projected to the light tunnel after passing through the filter.

17. The illumination system as claimed in claim 12, wherein the illumination system comprises a plurality of light guiding elements, a first light guiding element of the light guiding elements is disposed between the luminous element and the color wheel module, and the first light guiding element reflects the second selected wave band lights to the filter.

18. The illumination system as claimed in claim 17, wherein the light guiding elements have a plurality of second light guiding elements to reflect the first wave band blue lights, the first selected wave band lights, and the second wave band blue lights to the filter.

19. The illumination system as claimed in claim 12, wherein the illumination system comprises a plurality of lenses to focus at least one of the first wave band blue lights, the first selected wave band lights, the second wave band blue lights and the second selected wave band lights.

20. The illumination system as claimed in claim 11, wherein a wavelength of each of the first wave band blue lights and the first selected wave band lights is 460 nm.

21. The illumination system as claimed in claim 11, wherein a wavelength of each of the second wave band blue lights and the second selected wave band lights is 448 nm.

22. The illumination system as claimed in claim 11, wherein the first wave band blue lights and the second wave band blue lights are emitted alternately.

23. The illumination system as claimed in claim 11, wherein the stereoscopic projection device has an imaging module for transforming the first wave band blue lights and the first selected wave band lights into a first projection picture and transforming the second wave band blue lights and the second selected wave band lights into a second projection picture respectively.

* * * * *